(12) United States Patent
Lee et al.

(10) Patent No.: US 6,832,017 B2
(45) Date of Patent: *Dec. 14, 2004

(54) BIDIRECTIONAL ADD/DROP MULTIPLEXER AND BIDIRECTIONAL ADD/DROP AMPLIFIER MODULE FOR BAND-SPLIT BIDIRECTIONAL NETWORKS (75) Inventors: Chang Hee Lee, Taejon (KR); Hyun Deok Kim, Daegu (KR); Jeong Hun Shin, Daegu (KR); Tae Won Oh, Daegu (KR); Yun Hee Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 508 days.

This patent is subject to a terminal disclaimer.

(21) Appl. No.: 09/767,702

(22) Filed: Jan. 24, 2001

(65) Prior Publication Data
US 2002/0039212 A1 Apr. 4, 2002

(30) Foreign Application Priority Data
Oct. 4, 2000 (KR) .................................. 10-2000-0058296

(51) Int. Cl.$^7$ ................................................. G02B 6/28
(52) U.S. Cl. ............................ 385/24; 385/31; 385/15; 398/43
(58) Field of Search .............................. 385/24, 31, 15; 398/43; 359/115

(56) References Cited

U.S. PATENT DOCUMENTS 6,529,656 B2 * 3/2003 Lee et al. ..................... 385/24

* cited by examiner

Primary Examiner—Akm Enayet Ullah
Assistant Examiner—Sung Pak
(74) Attorney, Agent, or Firm—Cha & Reiter, L.L.C.

(57) ABSTRACT

The present invention relates to a bidirectional add/drop multiplexer (BADM) and a bidirectional add/drop amplifier (BADA) module.

The present invention includes an N×N arrayed waveguide grating router (AWGR), two optical circulators, two wavelength selective couplers, two optical isolators, and a mid-stage device. The mid-stage device comprises a means for compensating the chromatic dispersion of the optical fibers, a means for flattening the spectral response of the optical amplifiers, a means for suppressing the accumulation of the ASE noise or a combination of these means.

13 Claims, 7 Drawing Sheets

BIDIRECTIONAL ADD/DROP MULTIPLEXER AND BIDIRECTIONAL ADD/DROP AMPLIFIER MODULE FOR BAND-SPLIT BIDIRECTIONAL NETWORKS

BACKGROUND OF THE INVENTION

1. Field of the Invention

The present invention relates to a bidirectional add/drop multiplexer (BADM) and a bidirectional add/drop amplifier (BADA) module. More particularly, it relates to the BADM and the BADA module with a mid-stage device that is shared by the counter-propagating signals in different wavelength bands.

2. Description of the Related Art

A wavelength-division multiplexing (WDM) optical network uses different wavelengths to establish communication channels among the nodes. The network requires add/drop function for receiving/transmitting wanted wavelength signals at each node. Therefore, a WDM add/drop multiplexer (ADM) is an important constituent to realize the WDM optical network. The ADM is especially emphasized in a WDM ring network.

A bidirectional WDM ring network can be realized by using either undirectional ADMs or BADMs. The BADM, which can add/drop WDM signals propagating bidirectionally over a single fiber, reduces the use of fiber infrastructure by a factor two.

Figure 1:
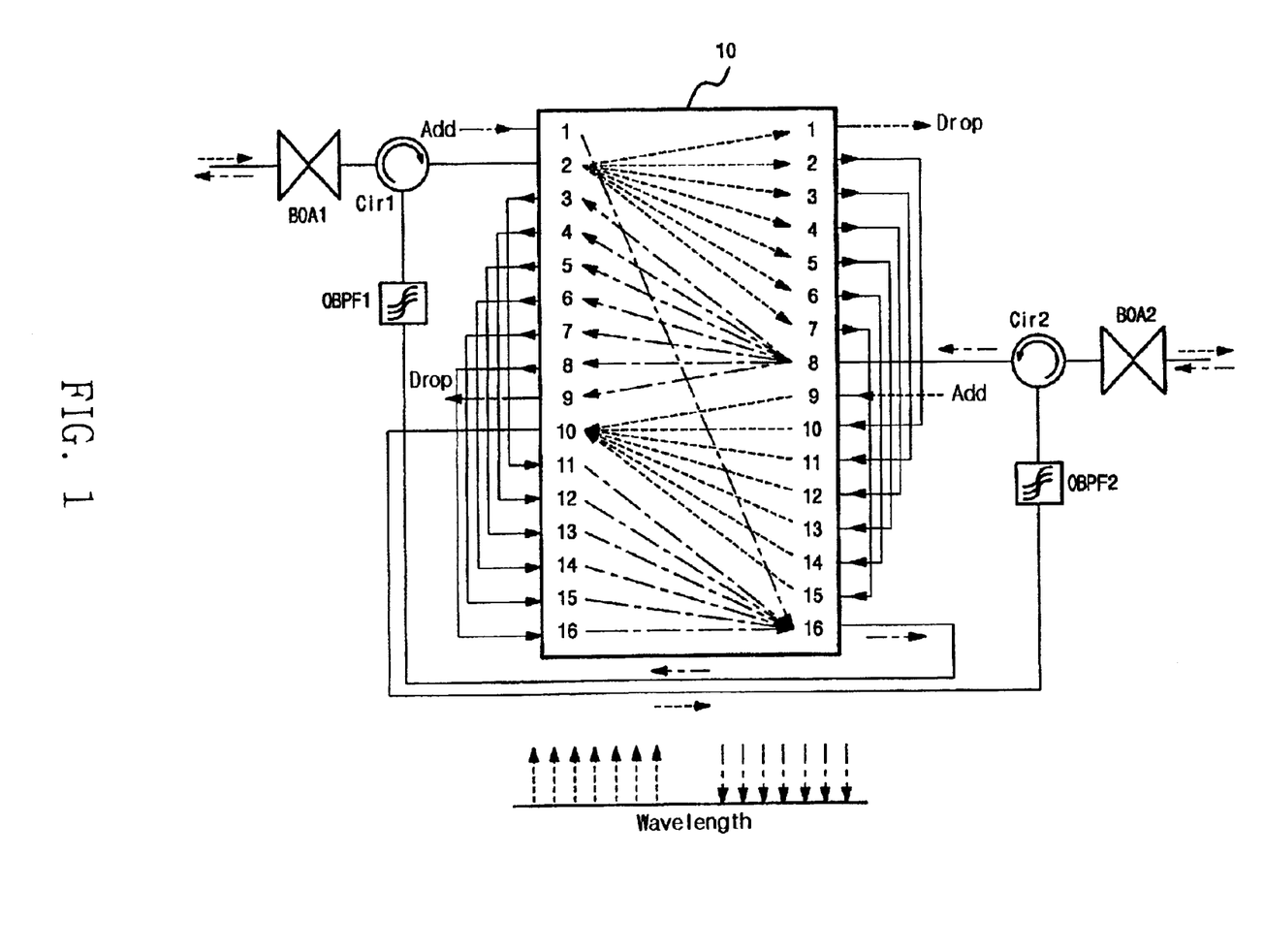
FIG. 1 shows a schematic diagram for a conventional band-split bidirectional add/drop optical amplifier module.

FIG. 1 shows an example of such a BADM proposed in a paper of C. H. Kim, Chang-Hee Lee, and Y. C. Chung, "A novel bidirectional add/drop amplifier (BADA)," *IEEE Photon. Technol. Lett.*, vol. 10, pp. 1118–1120, 1998. Compared to the conventional BADM, the bidirectional add/drop amplifier (BADA) module of FIG. 1 further provides the function of signal amplification. Namely, the BADA module could not only add/drop but also amplify WDM signals propagating bidirectionally over a single fiber. Especially the BADA module of FIG. 1 was used to accommodate two groups of WDM signals whose wavelength-bands are split according to the their propagation direction.

Meanwhile, in order to increase the capacity and extend the geographical scale of the WDM networks, the following three means are generally used: (1) Means for compensating the chromatic dispersion of the optical fibers. (2) Means for flattening the spectral response of the optical amplifiers. (3) Means for suppressing the accumulation of the amplified spontaneous emission (ASE) noise. The dispersion compensating fiber (DCF) is a typical means for compensating the chromatic dispersion of the optical fibers, the gain flattening filter (GFF) for flattening the spectral response of the optical amplifiers, and the ASE rejection filter for suppressing the accumulation of the ASE noise. These devices are usually used in the mid-stage of the optical amplifiers in order to minimize the optical signal-to-noise ratio degradation.

There are some problems to incorporate the midstage devices with the BADA module of FIG. 1. For example, we should use different DCF for each way signal to prevent the signal degradation induced by the large back reflection of the DCF, which increases the cost of dispersion compensation.

SUMMARY OF THE INVENTION

The present invention is contrived in order to solve the above-mentioned problems. It is an object of the present invention to provide a BADM and a BADA module. Wherein, (1) the mid-stage device for increasing the capacity and extending the geographical scale of the networks, including a DCF, a GFF and an ASE rejection filter, is shared by the counter-propagating signals. (2) The counter-propagating signals pass through the shared mid-stage device in opposite direction each other to minimize the signal impairment in it. (3) The relative intensity noise (RIN) induced by the multiple reflection is effectively suppressed.

In order to meet the above object, the present invention includes an N×N arrayed waveguide grating router (AWGR), two optical circulators, two wavelength selective couplers, two optical isolators, and a mid-stage device. The mid-stage device comprises a means for compensating the chromatic dispersion of the optical fibers, a means for flattening the spectral response of the optical amplifiers, a means for suppressing the accumulation the ASE noise or a combination of these means.

BRIEF DESCRIPTION OF THE DRAWINGS

Exemplary embodiments of the present invention will be described in conjunction with the drawings in which.

EXPLANATIONS FOR MAIN SYMBOLS IN THE DRAWINGS

10: arrayed waveguide grating router (AWGR),
12: mid-stage device,
Cir1, Cir2, Cir3: optical circulator,
OBPF1, OBPF2: optical band pass filter (OBPF),
Iso1, Iso2, Iso3, Iso4, Iso5, Iso6: optical isolator,
BOA1, BOA2: bidirectional optical amplifier (BOA),
UOA1, UOA2: unidirectional optical amplifier (UOA),
WSC1, WSC2, WSC3, WSC4: wavelength selective coupler (WSC).

DETAILED DESCRIPTION OF THE EMBODIMENTS

The first embodiment of the BADM according to the present invention comprises an N×N AWGR (10), two optical circulators (Cir1, Cir2), two wavelength selective couplers (WSC1, WSC2), two optical isolators (Iso1, Iso2) and a mid-stage device (12).

Each component of the BADM is examined in detail as follows: (1) Each of the two wavelength selective couplers (WSC1, WSC2) has an input port (d1 or d2), an output port (f1 or f2), and a common port (e1 or e2) (2) Each of the two optical isolators (Iso1, Iso2) has an input port (g1 or g2) and an output port (h1 or h2) (3) Each of the two optical circulators (Cir1, Cir2) has an input port (a1 or a2), an output port (c1 or c2), and a common port (b1 or b2). (4) An N×N AWGR, which has N input/output ports at its both sides, routes the counter-propagating WDM signals. (5) A mid-stage device comprises a means for compensating the chromatic dispersion of the optical fibers, a means for flattening the spectral response of the optical amplifiers, a means for suppressing the accumulation the ASE noise or a combination of these means.

The connections among the components are as follows: The output port (f1 or f2) of the wavelength selective coupler (WSC1 or WSC2) is connected to the input port (a1 or a2) of the optical circulator (Cir1 or Cir2). The input port (d1 or d2) of the wavelength selective coupler (WSC1 or WSC2) is connected to the output port (h1 or h2) of the optical isolator (Iso1 or Iso2). The input port (g1 or g2) of the optical isolator (Iso1 or Iso2) is connected to one input/output port of the N×N AWGR (10). The output port (c1 or c2) of the optical circulator (Cir1 or Cir2) is connected to another input/output port of the N×N AWGR (10). The common ports (b1 and b2) of the optical circulator (Cir1 and Cir2) are connected to the both ends of the mid-stage device (12).

The first embodiment of the BADA module according to the present invention comprises the above-described BADM and two bidirectional optical amplifiers (BOA1, BOA2) which amplifies the counter-propagating signals simultaneously. The connections of the optical amplifiers and the components in the above-described BADM are as follows: The common port (e1 or e2) of the wavelength selective coupler (WSC1 or WSC2) in the above-described BADM is connected to the bidirectional amplifier (BOA1 or BOA2).

The BADA module can further comprises two unidirectional optical amplifiers (UOA1 or UOA2). Each unidirectional amplifier amplifies only one way signal and connected between the output port (c1 or c2) of the optical circulator (Cir1 or Cir2) and one input/output port of the N×N AWGR.

Figure 2:
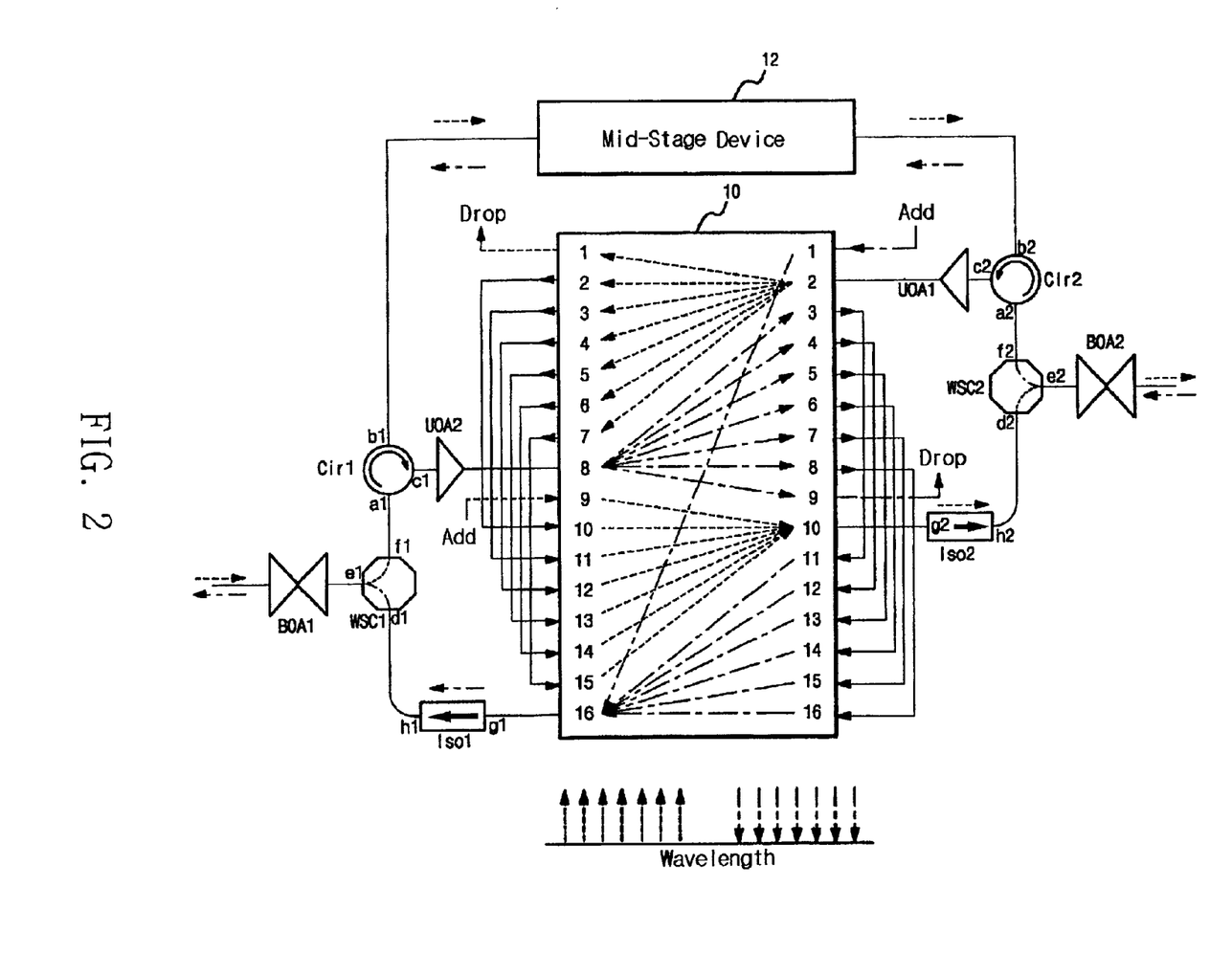
FIG. 2 shows a schematic diagram for a band-split bidirectional add/drop optical amplifier module according to the first embodiment of the present invention.

FIG. 2 shows a schematic diagram of the BADM and the BADA module according to the first embodiment of the present invention. The exemplary embodiment of FIG. 2 is a specific one implemented by using a 16×16 AWGR (10). The BADM and the BADA module of FIG. 2 can accommodate seven downstream signals propagating from the left to the right and seven upstream signals propagating from the right to the left. The downstream and the upstream signals are allocated in different wavelength bands as shown in FIG. 2.

The difference of the BADM and the BADA is the capability of the signal amplification. The BADA module contains optical amplifiers (BOA1, BOA2, UOA1, UOA2), while the BADM none.

The operation principle of the BADM of FIG. 2 is as follows.

The downstream signals inputted to the common port (e1) of the WSC1 pass through the WSC1 and the Cir1 and enter into the mid-stage device (12). After passing through the mid-stage device (12) and the Cir2, the downstream signals enter into the AWGR (10) via the right-hand side port 2. The AWGR demultiplexes the downstream signals and the demultiplexed signals come out through the left-hand side port 1, 2, 3, 4, 5, 6 and 7 of the AWGR (10). Any of the demultiplexed signals can be either dropped or pass through the BADM. For example, the signal to be received at the BADM is dropped via the left-hand side port 1 of the AWGR (10). The other signals are folded back to the left-hand side port 10, 11, 12, 13, 14, and 15, of the AWGR (10) to pass through the BADM. The signal with identical wavelength with the dropped signal can be added through the left-hand side port 9 of the AWGR (10). The AWGR (10) multiplexes the signals folded back and added and the multiplexed downstream signals come out through the right-hand side port 10 of the AWGR (10). Then, the downstream signals pass through the Iso2 and come out through the common port (e2) of the WSC2.

The upstream signals inputted to the common port (e2) of the WSC2 pass through the WSC2 and the Cir2 and enter into the mid-stage device (12). After passing through the mid-stage device (12) and the Cir1, the upstream signals enter into the AWGR (10) via the left-hand side port 8. The AWGR demultiplexes the upstream signals and the demultiplexed signals come out through the right-hand side port 3, 4, 5, 6, 7, 8, and 9 of the AWGR (10). Any of the demultiplexed signals can be either dropped or pass through the BADM. For example, the signal to be received at the BADM is dropped via the right-hand side port 9 of the AWGR (10). The other signals are folded back to the right-hand side port 11, 12, 13, 14, 15 and 16 of the AWGR (10) to pass through the BADM. The signal with identical wavelength with the dropped signal can be added through the right-hand side port 1 of the AWGR (10). The AWGR (10) multiplexes the signals folded back and added signal and the multiplexed upstream signals come out through the left-hand side port 16 of the AWGR (10). Then, the signals pass through the Iso1 and come out through the common port (e1) of the WSC 1.

As mentioned above, the upstream and the downstream signals simultaneously pass through a mid-stage device (12) in the first embodiment of the present invention. However, the nonlinear interaction between the upstream and the downstream signals in the mid-stage device (12) will be negligible since they propagate in opposite direction each other in it (12).

The BADA module of FIG. 2 comprises above-described BADM and two bidirectional amplifiers (BOA1, BOA2) for amplifying signals. The BOA1 and the BOA2 used in the first embodiment of the BADA module are connected to the common ports (e1, e2) of the WSC1 and WSC2 of the above-described BADM, respectively. They amplify the upstream and the downstream signals simultaneously. The BADA module can further comprises two unidirectional amplifiers (UOA1 and UOA2) as shown in FIG. 2. The UOA1 is connected between the output port (c2) of the Cir2 and the right-hand side port 2 of the AWGR (10) to further amplify the downstream signal. The UOA2 is connected between the output port (c1) of the Cir1 and the left-hand side port 8 of the AWGR (10) to further amplify the upstream signal.

The BOA1, the BOA2, the UOAL and the UOA2 are one of the followings; semiconductor optical amplifier, rare-earth element (such as Er, Pr, Tm) doped optical fiber amplifier, and Raman optical amplifier.

Figure 3:
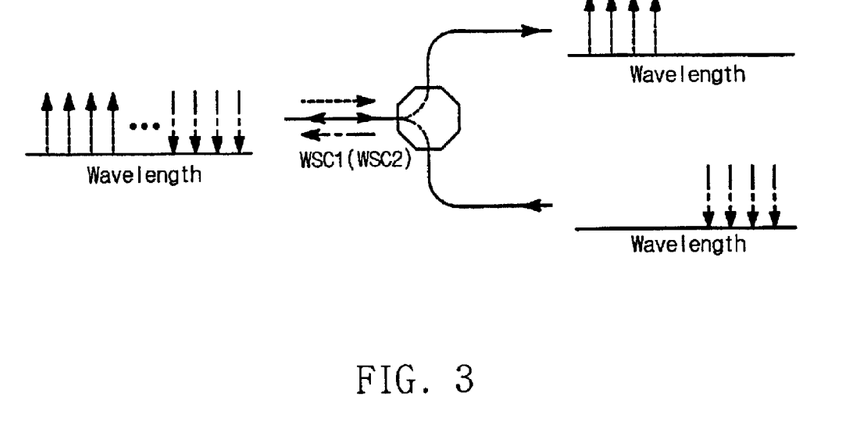
FIG. 3 shows a characteristic diagram for the wavelength selecting coupler shown in FIG. 2.

As shown in FIG. 3, the wavelength selective coupler (WSC1, WSC2) routes bidirectionally two groups of WDM signals that are allocated in different wavelength bands. A typical example of such a wavelength selective coupler is a wavelength division multiplexer.

Figure 4:
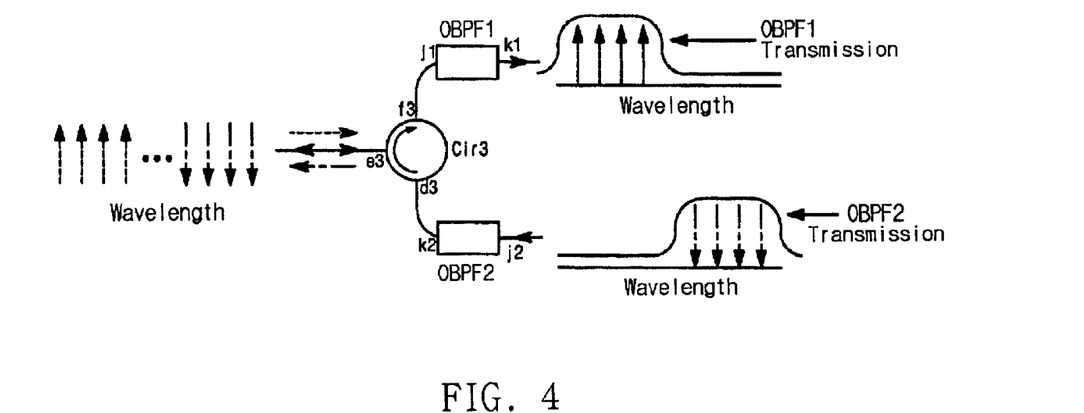
FIG. 4 shows another characteristic diagram for the wavelength selecting coupler comprising a circulator and two optical band pass filters.

The wavelength selective coupler (WSC1, WSC2) can be realized with an optical circulator (Cir4) and two optical band pass filters (OBPF1, OBPF2) as shown in FIG. 4. In this case, the pass bands the filters are not overlapped.

In other words, the wavelength selective coupler (WSC1 or WSC2) comprises; (1) an optical circulator (Cir4) with an input (d4), an output (f4) and an common port (e4). (2) An OBPF1 with an input (j1) and an output port (k1). (3) An OBPF2 with an input (j2) and an output port (k2) with different pass-band from that of OBPF1. The out port (f4) of the optical circulator (Cir4) is connected to the input port (j1) of OBPF1, and the input port (d4) of the optical circulator (Cir4) is connected to the output port (k2) of OBPF2.

The relative intensity noise (RIN) caused by the Rayleigh back scattering of the optical fiber and/or the reflections of the optical components can degrade receiver sensitivity in bidirectional optical networks. The RIN accumulates along the signal path since the optical amplifier amplifies the RIN as well as signals. Thus, it is desirable that the BADA module can attenuate the multiple reflection induced RIN.

Figure 5:
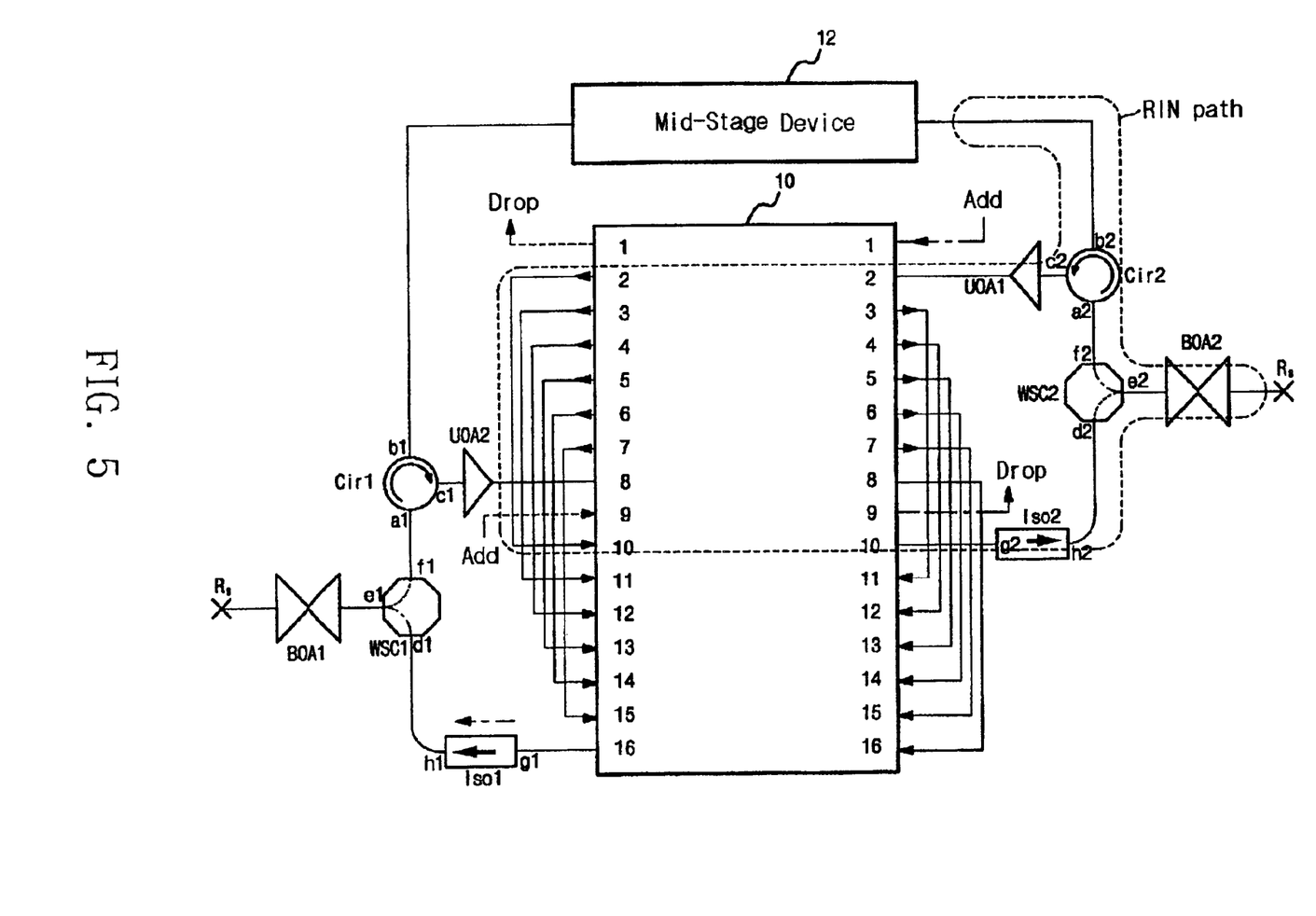
FIG. 5 shows a path for generating the relative intensity noise (RIN) in FIG. 2.
Figure 6:
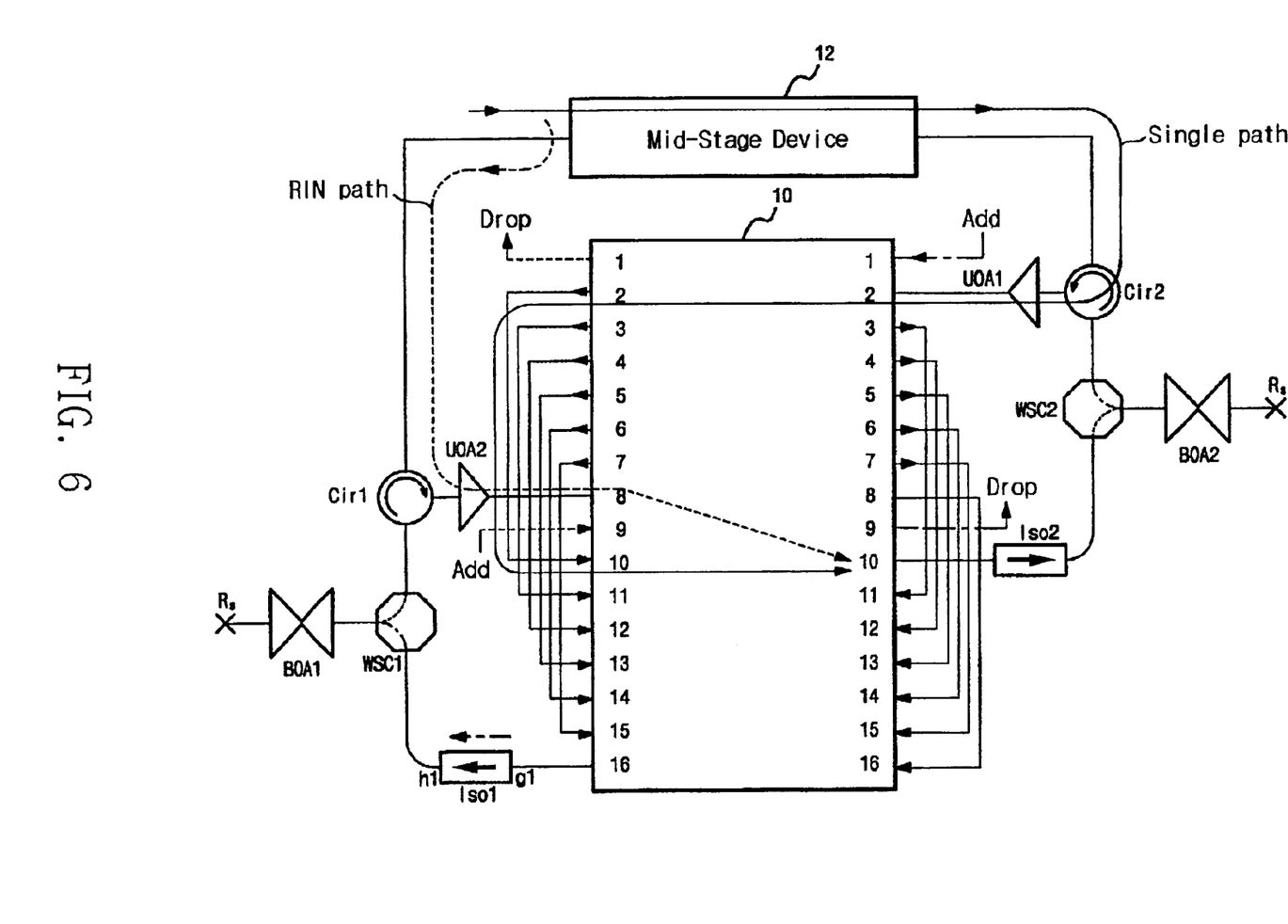
FIG. 6 shows another path for generating the relative intensity noise (RIN) in FIG. 2.

There are two main RIN paths when the optical fibers are connected to both sides of the BADA module of FIG. 2. The first and the second RIN paths are depicted in FIG. 5 and FIG. 6, respectively. For simplicity, they show a case for only one downstream signal. $R_s$ is the Rayleigh back scattering coefficient of the optical fibers connected to the BADA module.

As depicted in FIG. 5, the first RIN is generated due to the reflection at the mid-stage device (12) and the Rayleigh back scattering of the optical fiber connected to the right-hand side of the BADA module. The downstream signal is reflected by an amount of $R_s$ at the optical fiber. The reflected signal is amplified at the BOA2 and leaks to the output port of the WSC2 due to the finite crosstalk level of the WSC 2. Then, it is reflected at the mid-stage device (12) after passing through the optical circulator (Cir2), combines with the main signal, and propagates along the downstream signal route to generate RIN. The RIN generated in this path is attenuated by an amount of the crosstalk level of the WSC2.

As depicted in FIG. 6, the second RIN is generated due to the reflection at the mid-stage device (12) and the crosstalk of the AWGR (10). The reflected signal at the mid-stage device (12) passes through the Cir1 and the UOA2 and enters into the left-hand side port 8 of the AWGR (10). Then, it leaks to the right-hand side port 10 of the AWGR (10) due to the finite crosstalk level of the AWGR (10), combines with the main signal and propagates along the downstream signal route to generate RIN. The RIN generated in this path is attenuated by an amount of the crosstalk level of the AWGR (10). There are corresponding RIN paths for the other downstream signals and the upstream signals.

The multiple reflection induced RINs are attenuated at least once by the AWGR (10) or the wavelength selective coupler (WSC1 or WSC2) in BADA module according to the present invention. Thus, the BADA module sufficiently suppresses the RIN even if the mid-stage device (12) includes a DFC with high Rayleigh back scattering coefficient.

The BADM and the BADA module according to the second embodiment of the present invention is realized by using the same optical components used in the first embodiment, while it has a different configuration.

The second embodiment of the BADM according to the present invention comprises: (1) Two wavelength selective couplers (WSC1, WSC2) with an input port (d1 or d2), an output port (f1 or f2), and a common port (e1 or e2). (2) Two optical isolators (Iso1, Iso2) with an input port (g1 or g2) and an output port (h1 or h2). (3) Two optical circulators (Cir1, Cir2) with an input port (a1 or a2), an output port (c1 or c2) and a common port (b1 or b2). (4) An N×N AWGR with N input/output ports at its both sides routing the counter-propagating WDM signals. (5) A mid-stage device comprises a means for compensating the chromatic dispersion of the optical fibers, a means for flattening the spectral response of the optical amplifiers, a means for suppressing the accumulation the ASE noise or a combination of these means.

And the connections are follows. (1) The input port (d1 or d2) of the wavelength selective coupler (WSC1 or WSC2) is connected to the output port (c1 or c2) of the optical circulator (Cir1 or Cir2). (2) The output port (f1 or f2) of the wavelength selective coupler (WSC1 or WSC2) is connected to the input port (g1 or g2) of the optical isolator (Iso1 or Iso2). (3) The output port (h1 or h2) of the optical isolator (Iso1 or Iso2) is connected to one input/output port of the N×N AWGR. (4) The input port (a1 or a2) of the optical circulator (Cir1 or Cir2) is connected to another input/output port of the N×N AWGR. And (5) the common ports (b1 and b2) of the optical circulators (Cir1 and Cir2) are connected to the both ends of the mid-stage device.

The second embodiment of the BADA module comprises the above-described BADM and two bidirectional optical amplifiers (BOA1, BOA2) which can amplifies the counter-propagating signals simultaneously. The connections of the optical amplifiers and the components in the above-described BADM are as follows: The common port (e1 or e2) of the wavelength selective coupler (WSC1 or WSC2) in the above-described BADM is connected to the bidirectional amplifier (BOA1 or BOA2).

The BADA module can further comprises two unidirectional optical amplifiers (UOA1 or UOA2). Each unidirectional amplifier amplifies only one way signal and connected between one input/output port of the N×N AWGR and the input port (a1 or a2) of the optical circulator (Cir1 or Cir2).

Figure 7:
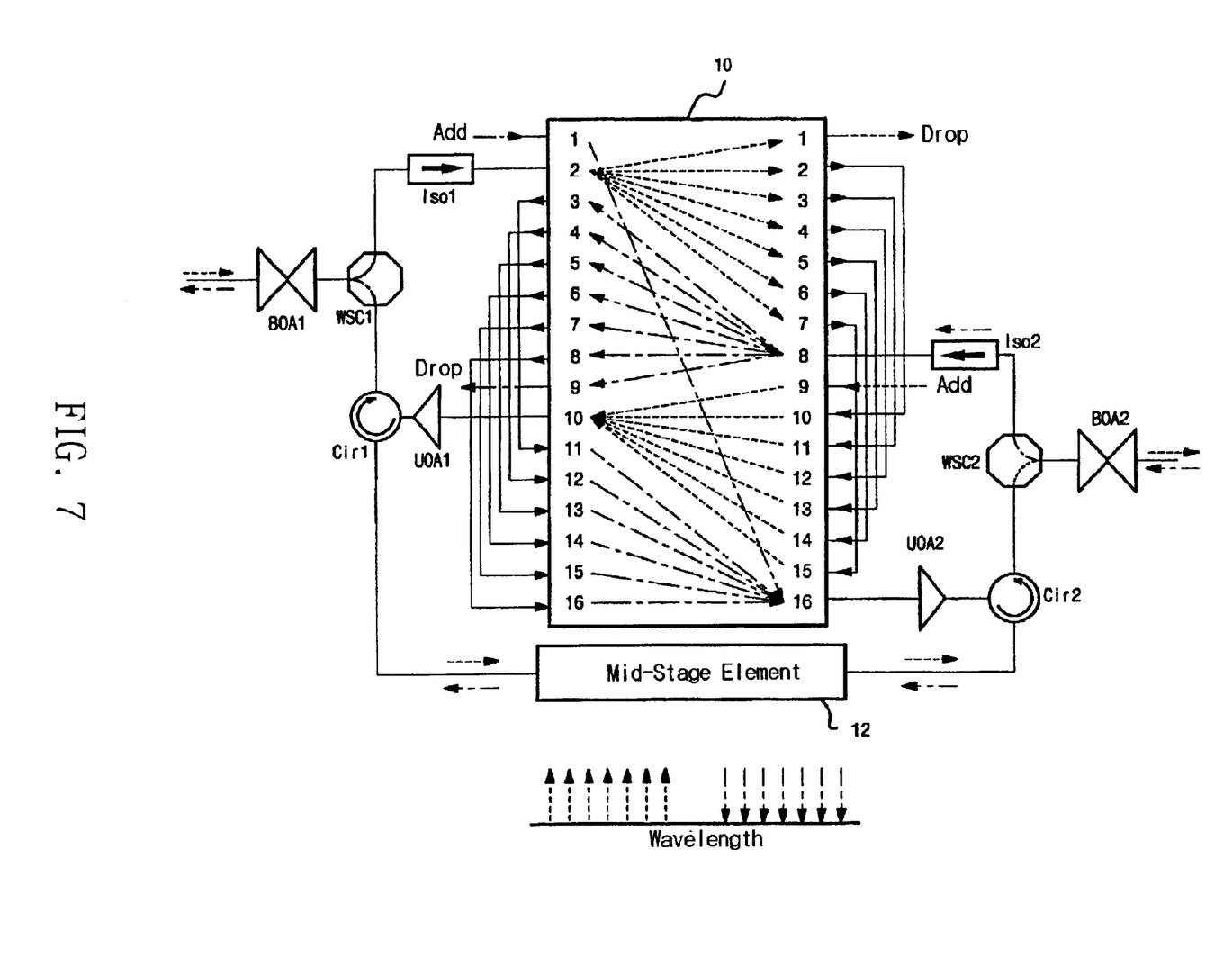
FIG. 7 shows a schematic diagram for a band-split bidirectional add/drop optical amplifier module according to the second embodiment of the present invention.

FIG. 7 shows a schematic diagram of the BADM and the BADA module according to the second embodiment of the present invention. The exemplary embodiment of FIG. 7 is a specific one implemented by using a 16×16 AWGR (10). The BADM and BADA module of FIG. 7 can accommodate seven downstream signals propagating from the left to the right and seven upstream signals propagating from the right to the left. The downstream and the upstream signals are interleaved in wavelength domain as shown in FIG. 7.

The difference of the BADM and the BADA is the capability of the signal amplification. The BADA module contains optical amplifiers (BOA1, BOA2, UOA1, UOA2), while the BADM none.

The operation principle of the BADM of FIG. 7 is as follows.

The downstream signals inputted to the common port (e1) of the WSC1 pass through the WSC1 and the Iso1 and enter into the AWGR (10) via left-hand side port 2. The AWGR demultiplexes the downstream signals and the demultiplexed signals come out through the right-hand side port 1, 2, 3, 4, 5, 6, and 7 of the AWGR (10). Any of the demultiplexed signals can be either dropped or pass through the BADM. For example, the signal to be received at the BADM is dropped via the right-hand side port 1 of the AWGR (10). The other signals are folded back to the right-hand side port 10, 11, 12, 13, 14, and 15 of the AWGR (10) to pass through the BADM. The signal with identical wavelength with the dropped signal can be added through the right-hand side port 9 of the AWGR (10). The AWGR (10) multiplexes the signals folded back and added and the multiplexed downstream signals come out through the left-hand side port 10 of the AWGR (10). The multiplexed downstream signals pass through the Cir1, mid-stage device (12) and the Cir2 and come out through the common port (e2) of the WSC2.

The upstream signals inputted to the common port (e2) of the WSC2 pass through the WSC2 and the Iso2 and enter into the AWGR (10) via right-hand side port 8. The AWGR demultiplexes the upstream signals and the demultiplexed signals come out through the left-hand side port 3, 4, 5, 6, 7, 8 and 9 of the AWGR (10). Any of the demultiplexed signals can be either dropped or pass through the BADM. For example, the signal to be received at the BADM is dropped via the left-hand side port 9 of the AWGR (10). The other signals are folded back to the left-hand side port 11, 12, 13, 14, 15 and 16 of the AWGR (10) to pass through the BADM. The signal with identical wavelength with the dropped signal can be added through the left-hand side port 1 of the AWGR (10). The AWGR (10) multiplexes the signals folded back and added and the multiplexed upstream signals come out through the right-hand side port 16 of the AWGR (10). The multiplexed downstream signals pass through the Cir2, mid-stage device (12) and the Cir1 and come out through the common port (e1) of the WSC1.

The BADA module of FIG. 7 comprises above-described BADM and two bidirectional amplifiers (BOA1, BOA2) for amplifying signals. The BOA1 and the BOA2 used in FIG. 2 are connected to the common ports (e1, e2) of the WSC1 and the WSC2 in the above-described BADM. As shown in FIG. 7, the BADA module can further comprises two unidirectional amplifiers (UOA1 and UOA2) used in FIG. 2. The UOA1 is connected between the left-hand side port 10 of the AWGR (10) and the input port (a1) of the Cir1 to further amplify the downstream signal. The UOA2 is connected between the right-hand side port 16 of the AWGR (10) and the input port (a2) of the Cir2 to further amplify the upstream signal.

In the second embodiment of the BADM and BADA module, the signals first enter into the AWGR (10) and then pass through the mid-stage device (12), while the signals first pass though the mid-stage device (12) and then enter into the AWGR (10) in the first embodiment.

As mentioned forth, there are tow RIN paths depicted in FIG. 5 and FIG. 6 when the optical fibers are connected to the both sides of the BADA module of FIG. 2. The RIN paths for the BADA modules of FIG. 7 are similar to that of FIG. 2.

We can reduce the RINs by replacing the optical circulators (Cir1 and Cir2) in BADA module of FIG. 2 and FIG. 7 with the two wavelength selective coupler and two optical isolators. The BADM and the BADA module according to the third embodiment of the present invention is realized from the first and the second embodiments with the replacement.

Figure 8:
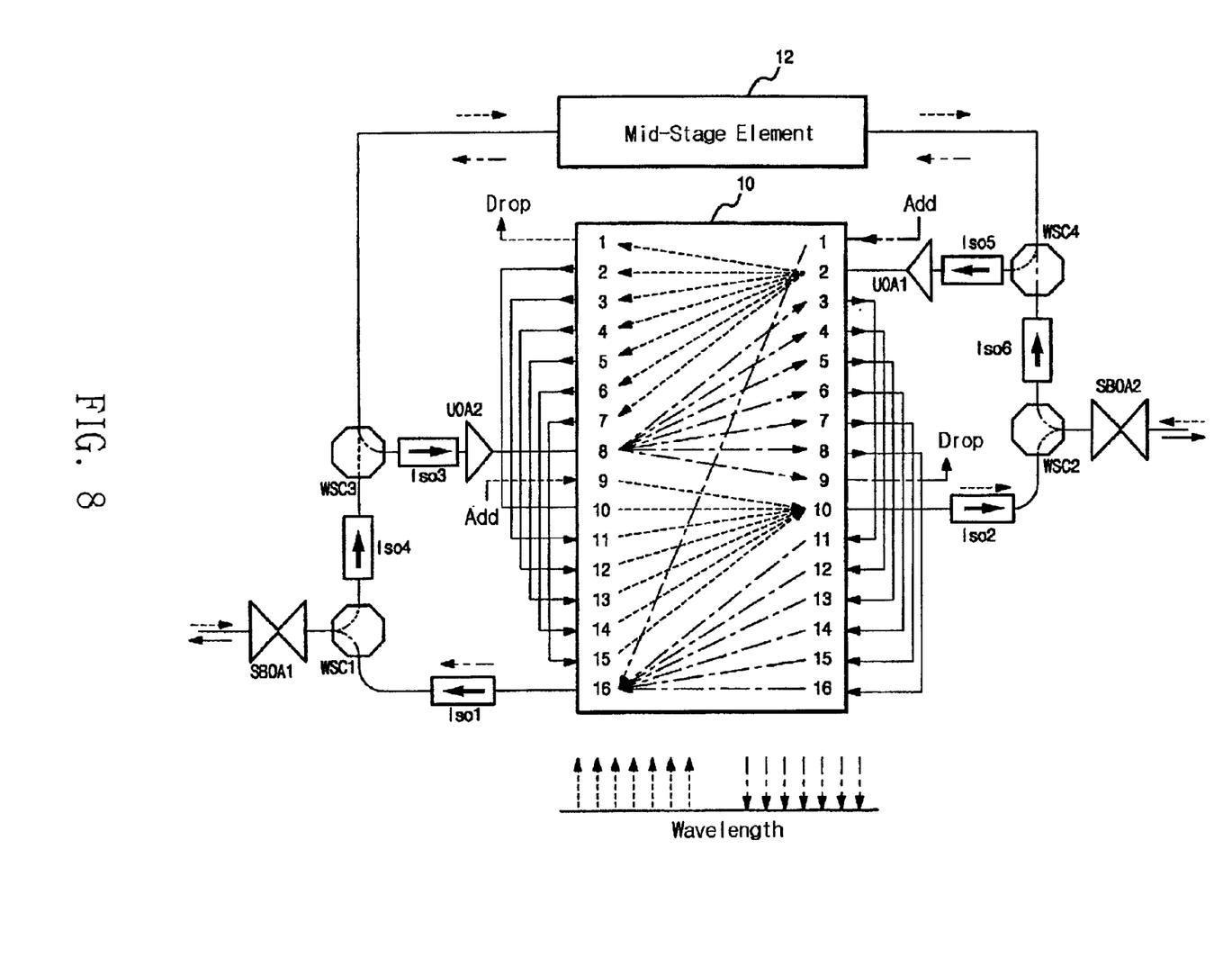
FIG. 8 shows a schematic diagram for a band-split bidirectional add/drop optical amplifier module according to the third embodiment of the present invention.

FIG. 8 shows the third embodiment of BADM and the BADA module with the replacements: The first optical circulator (Cir1) in FIG. 2 is replaced with WSC3 and two optical isolators (Iso3, Iso4), and the second optical circulator (Cir2) with WSC4 and two other optical isolators (Iso5, Iso6). The replaced wavelength selective coupler (WSC3 or WSC4) attenuates the RIN in FIG. 5 and FIG. 6 one more time.

As mentioned so far, in the BADM and BADA module according to the present invention, the counterpropagating signals (upstream and downstream signals) share a single mid-stage device (12). Especially, since the upstream and downstream signals pass through the mid-stage device (12) in opposite direction each other, the nonlinear interactions between them will be negligible. In addition, the BADA module according to the present invention is designed to suppress the RINs induced by the multiple reflections.

Therefore, the BADM and the BADA module according to the embodiments of the present invention provide the following effects. First, the mid-stage device for increasing the capacity and extending the geographical scale of the network, including a DCF, a GFF and an ASE rejection filter, is incorporated economically with them. Second, there is little increase of the signal impairments induced by the nonlinear interactions between counter-propagating signals even though they share a single mid-stage device. Third, the RIN accumulation is sufficiently suppressed.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A bidirectional add/drop multiplexer for processing downstream and upstream signals, comprising:

two wavelength selective couplers (WSC1, WSC2) with an input port (d1 or d2), an output port (f1 or f2), and a common port (e1 or e2);

two optical isolators (Iso1, Iso2) with an input port (g1 or g2) and an output port (h1 or h2);

two optical circulators (Cir1, Cir2) with an input port (a1 or a2), an output port (c1 or c2) and a common port (b1 or b2);

a multiplexing/demultiplexing means with N input/output ports at its both sides; and a mid-stage device composed of a means for compensating the chromatic dispersion of the optical fibers, a means for flattening the spectral responses of the optical amplifiers, a means for suppressing accumulation of the amplified spontaneous emission noise or a combination of these means, and wherein the output port (f1 or f2) of the wavelength selective coupler (WSC1 or WSC2) is connected to the input port (a1 or a2) of the optical circulator (Cir1 or Cir2);

the input port (d1 or d2) of the wavelength selective coupler (WSC1 or WSC2) is connected to the output port (h1 or h2) of the optical isolator (Iso1 or Iso2);

the input port (g1 or g2) of the optical isolator (Iso1 or Iso2) is connected to an input/output of the multiplexing/demultiplexing means;

the output port (c1 or c2) of the optical circulator (Cir1 of Cir2) is connected to another input/output port of the multiplexing/demultiplexing means; and the common ports (b1 and b2) of the optical circulators (Cir1 and Cir2) are connected to both ends of the mid-stage device (12), wherein the downstream and upstream signals are not overlapped.

2. A bidirectional add/drop multiplexer for processing downstream and upstream signals, comprising:

two wavelength selective couplers (WSC1, WSC2) with an input port (d1 or d2), an output port (f1 or f2), and a common port (e1 or e2);

two optical isolators (Iso1, Iso2) with an input port (g1 or g2) and an output port (h1 or h2);

two optical circulators (Cir1, Cir2) with an input port (a1 or a2), an output port (c1 or c2) and a common port (b1 or b2);

a multiplexing/demultiplexing means with N input/output ports at its both sides; and a mid-stage device composed of a means for compensating the chromatic dispersion of the optical fibers, a means for flattening the spectral responses of the optical amplifiers, a means for suppressing accumulation of the amplified spontaneous emission noise or a combination of these means, and wherein, the input port (d1 or d2) of the wavelength selective coupler (WSC1 or WSC2) is connected to the output port (c1 or c2) of the optical circulator (Cir1 or Cir2);

the output port (f1 or f2) of the wavelength selective coupler (WSG1 or WSG2) is connected to the input port (g1 or g2) of the optical isolator (Iso1 or Iso2);

the output port (h1 or h2) of the optical isolator (Iso1 or Iso2) is connected to an input/output port of the multiplexing/demultiplexing means;

the input port (a1 or a2) of the optical circulator (Cir1 or Cir2) is connected to another input/output port of the multiplexing/demultiplexing means; and the common ports (b1 and b2) of the optical circulators (Cir1 and Cir2) are connected to both ends of the mid-stage device (12), wherein the downstream and upstream signals are not overlapped.

3. A bidirectional add/drop multiplexer as defined in claim 1 or claim 2, wherein the counter-propagating upstream/downstream signals pass through the mid-stage device in opposite directions each other.

4. A bidirectional add/drop multiplexer as defined in claim 1 or claim 2, wherein the multiplexing/demultiplexing means comprises an N×N arrayed waveguide grating router.

5. A bidirectional add/drop multiplexer as defined in claim 1 or claim 2, wherein the optical circulator (Cir1 or Cir2) comprises a wavelength selective coupler (WSC3 or WSG4) and two optical isolators ((Iso3, Iso4) or (Iso5, Iso6)).

6. A bidirectional add/drop multiplexer as defined in claim 1, wherein the wavelength selective coupler (WSC1, WSC2) comprises:

an optical circulator (Cir4) with an input (d4), an output (f4) and a common port (e4);

an optical band pass filter (OBPF1) with an input (j1) and an outout port (k1) passing the signals with wavelengths in its pass band and blocking off the signals with wavelengths in its stop band; and an optical band pass filter (OBPF2) with an input (j2) and an output port (k2) whose pass and stop bands are opposite to those of OBPF1, and wherein, the output port (f4) of the optical circulator (Cir4) is connected to the input port (j1) of OBPF1; and the input port (d4) of the optical circulator (Cir4) is connected to the output port (k2) of OBPF2.

7. A bidirectional add/drop multiplexer as defined in claim 2, wherein the wavelength selective coupler (WSC1, WSC2) comprises:

an optical circulator (Cir4) with an input (d4), an output (f4) and a common port (e4);

an optical band pass filter (OBPF1) with an input (j1) and an output port (k1) passing the signals with wavelengths in its pass band and blocking off the signals with wavelengths in its stop band; and an optical band pass filter (OBPF2) with an input (j2) and an output port (k2) whose pass and stop bands are opposite to those of OBPF1, and wherein, the output port (f4) of the optical circulator (Cir4) is connected to the input port (j1) of OBPF1; and the input port (d4) of the optical circulator (Cir4) is connected to the output port (k2) of OBPF2.

8. A bidirectional add/drop multiplexer amplifier module for processing downstream and upstream signals, comprising:

two wavelength selective couplers (WSC1, WSC2) with an input port (d1 or d2), an output port (f1 or f2), and a common port (e1 or e2);

two optical isolators (Iso1, Iso2) with an input port (g1 or g2) and an output port (h1 or h2);

two optical circulators (Cir1, Cir2) with an input port (a1 or a2), an output port (c1 or c2) and a common port (b1 or b2);

a multiplexing/demultiplexing means with N input/output ports at its both sides;

a mid-stage device composed of a means for compensating the chromatic dispersion of the optical fibers, a means for flattening the spectral responses of the optical amplifiers, a means for suppressing accumulation of the amplified spontaneous emission noise or a combination of these means; and two bidirectional optical amplifiers (BOA1, BOA2) amplifing the counter-propagating signals simultaneously, and wherein, the output port (f1 or f2) of the wavelength selective coupler (WSC1 or WSC2) is connected to the output port (a1 or a2) of the optical circulator (Cir1 or Cir2);

the input port (d1 or d2) of the wavelength selective coupler (WSC1 or WSC2) is connected to the output port (h1 or h2) of the optical isolator (Iso1 or Iso2);

the input port (g1 or g2) of the optical isolator (Iso1 or Iso2) is connected to an input/output port the multiplexing/demultiplexing means;

the output port (c1 or c3) of the optical circulator (Cir1 or Cir2) is connected to another input/output port of the multiplexing/demultiplexing means;

the common ports (b1 and b2) of the optical circulators (Cir1 and Cir2) are connected to both ends of the mid-stage device (12); and the common port (e1 or e2) of the wavelength selective coupler (WSC1 or WSC2) is connected to a bidirectional optical amplifier (BOA1 or BOA2), wherein the downstream and upstream signals are not overlapped.

9. A bidirectional add/drop amplifier module as defined in claim 8 further comprising two unidirectional amplifiers (UOA1, UOA2) amplifying each way signal, wherein the unidirectional amplifier (UOA1 or UOA20) is inserted between the output port (c1 or c2) of the optical circulator (Cir1 or Cir2) and the multiplexing/demultiplexing means.

10. A bidirectional add/drop amplifier module for processing downstream and upstream signals, comprising:

two wavelength selective couplers (WSC1, WSC2) with an input port (d1 or d2), an output port (f1 or f2), and a common port (e1 or e2);

two optical isolators (Iso1, Iso2) with an input port (g1 or g2) and an output port (h1 or h2);

two optical circulators (Cir1, Cir2) with an input port (a1 or a2), an output port (c1 or c2) and a common port (b1 or b2);

a multiplexing/demultiplexing means with N input/output ports at its both sides;

a mid-stage device composed of a means for compensating the chromatic dispersion of the optical fibers, a means for flattening the spectral responses of the optical amplifiers, a means for suppressing accumulation of the amplified spontaneous emission noise or a combination of these means; and two bidirectional optical amplifiers (BOA1, BOA2) amplifying the counter-propagating signals simultaneously, and wherein, the input port (d1 or d2) of the wavelength selective coupler (WSC1 or WSC2) is connected to the output port (c1 or c2) of the optical circulator (Cir1 or Cir2);

the output port (f1 or f2) of the wavelength selective coupler (WSC1 or WSC2) is connected to the input port (g1 or g2) of the optical isolator (Iso1 or Iso2);

the output port (h1 or h2) of the optical isolator (Iso1 or Iso2) is connected to an input/output port of the multiplexing/demultiplexing means;

the input port (a1 or a2) of the optical circulator (Cir1 or Cir2) is connected to another input/output port of the multiplexing/demultiplexing means;

the common ports (b1 and b2) of the optical circulators (Cir1 and Cir2) are connected to both ends of the mid-stage device (12); and the common port (e1 or e2) of the wavelength selective coupler (WSC1 or WSC2) is connected to a bidirectional optical amplifier (BOA1 or BOA2), wherein the downstream and upstream signals are not overlapped.

11. A bidirectional add/drop optical amplifier module as defined in claim 10 further comprising two unidirectional amplifiers (UOA1, UOA2) amplifying each way signal, wherein the unidirectional amplifier (UOA1 or UOA2) is inserted between the input port (a1 or a2) of the optical circulator (Cir1 or Cir2) and the multiplexing/demultiplexing means.

12. A bidirectional add/drop optical amplifier module as defined in claim 8 or claim 10 wherein the bidirectional optical amplifier (BOA1 or BOA2) comprises one of the followings; a semiconductor optical amplifier, a rare-earth doped optical fiber amplifier, and a Raman optical fiber amplifier.

13. A bidirectional add/drop optical amplifier module as defined in claim 9 or claim 11, wherein each of the bidirectional optical amplifier (BOA1 or BOA2) and the unidirectional optical amplifier (UOA1 or UOA2) comprises one of the followings; a semiconductor optical amplifier, a rare-earth doped optical fiber amplifier, and a Raman optical fiber amplifier.

* * * * *